United States Patent
Matsuno et al.

(10) Patent No.: US 9,214,669 B2
(45) Date of Patent: Dec. 15, 2015

(54) NON-AQUEOUS ELECTROLYTE SECONDARY BATTERY

(71) Applicant: KABUSHIKI KAISHA TOSHIBA, Minato-ku (JP)

(72) Inventors: Shinsuke Matsuno, Tokyo (JP); Dai Yamamoto, Kanagawa (JP); Hideki Satake, Nagano (JP); Norio Takami, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 61 days.

(21) Appl. No.: 14/107,713

(22) Filed: Dec. 16, 2013

(65) Prior Publication Data

US 2014/0106225 A1    Apr. 17, 2014

(30) Foreign Application Priority Data

Jun. 15, 2011   (JP) .................................. 2011-133555

(51) Int. Cl.
*H01M 4/136* (2010.01)
*H01M 4/485* (2010.01)
(Continued)

(52) U.S. Cl.
CPC .............. *H01M 4/136* (2013.01); *H01M 4/366* (2013.01); *H01M 4/485* (2013.01);
(Continued)

(58) Field of Classification Search
CPC .... H01M 4/136; H01M 4/5825; H01M 4/485
See application file for complete search history.

(56) References Cited

U.S. PATENT DOCUMENTS 7,964,118 B2 *   6/2011   Iizuka et al. ............. 252/520.21
8,841,023 B2 *   9/2014   Abe et al. ...................... 429/188
(Continued)

FOREIGN PATENT DOCUMENTS

CN       102009969 A       4/2011
EP       2 124 272 A1     11/2009
(Continued)

OTHER PUBLICATIONS

International Search Report issued May 15, 2012 in PCT/JP2012/054376 filed Feb. 23, 2012.
(Continued)

*Primary Examiner* — Stewart Fraser
(74) *Attorney, Agent, or Firm* — Oblon, McClelland, Maier & Neustadt, L.L.P.

(57) ABSTRACT

A non-aqueous electrolyte secondary battery includes a positive electrode containing active material particles composed of a core section formed of olivine type $LiFePO_4$; an intermediate section that lies on the outer side of the core section and has $LiFe_xP_yO_z$; and a surface section that lies on the outer side of the intermediate section and has $LiFe_aP_bO_c$; and a negative electrode containing lithium titanate, in which battery the molar concentration ratio of Fe relative to P at the core section is greater than the average of x/y of $LiFe_xP_yO_z$, the average value of a/b of $LiFe_aP_bO_c$ at the surface section of the positive electrode active material particles is smaller than the average of x/y of $LiFe_xP_yO_z$, and the positive electrode active material particles include a region in which x/y of $LiFe_xP_yO_z$ at the intermediate section increases continuously or intermittently in the direction from the surface section toward the core section.

10 Claims, 1 Drawing Sheet

(51) Int. Cl.
  *H01M 10/0525* (2010.01)
  *H01M 4/58* (2010.01)
  *H01M 4/36* (2006.01)
  *H01M 2/02* (2006.01)

(52) U.S. Cl.
  CPC ....... *H01M 4/5825* (2013.01); *H01M 10/0525* (2013.01); *H01M 2/023* (2013.01); *Y02E 60/122* (2013.01); *Y02T 10/7011* (2013.01)

(56) References Cited

U.S. PATENT DOCUMENTS

| | | | |
|---|---|---|---|
| 2010/0075230 | A1 | 3/2010 | Matsuno et al. |
| 2010/0163790 | A1 | 7/2010 | Ceder et al. |
| 2011/0195304 | A1* | 8/2011 | Abe et al. ............. 429/188 |
| 2012/0231334 | A1* | 9/2012 | Kinoshita et al. ...... 429/211 |
| 2013/0337327 | A1* | 12/2013 | Sun et al. ............. 429/219 |

FOREIGN PATENT DOCUMENTS

| | | |
|---|---|---|
| JP | 2000-067925 | 3/2000 |
| JP | 2005-050556 | 2/2005 |
| JP | 2010-517240 | 5/2010 |
| JP | 2011-071019 | 4/2011 |
| JP | 2011-515813 | 5/2011 |
| WO | WO 2008/081944 A1 | 7/2008 |
| WO | WO 2008/091707 A2 | 7/2008 |
| WO | 2009/117871 | 10/2009 |

OTHER PUBLICATIONS

Extended European Search Report issued Oct. 16, 2014 in Patent Application No. 12801291.1.
She-huang Wu, et al., "Effects of $Fe_2P$ and $Li_3PO_4$ additives on the cycling performance of $LiFePO_4$/C composite cathode materials" Journal of Power Sources, vol. 196, 2011, pp. 6676-6681.
Combined Office Action and Search Report issued May 18, 2015 in Chinese Patent Application No. 201280029044.6 (with English language translation).
Office Action issued Jun. 16, 2015, in corresponding Japanese Patent Application No. 2011-133555 with English translation, 6 pages.
Office Action issued Jul. 10, 2015, in corresponding European Patent Application No. 12801291.1, 5 pages.

* cited by examiner

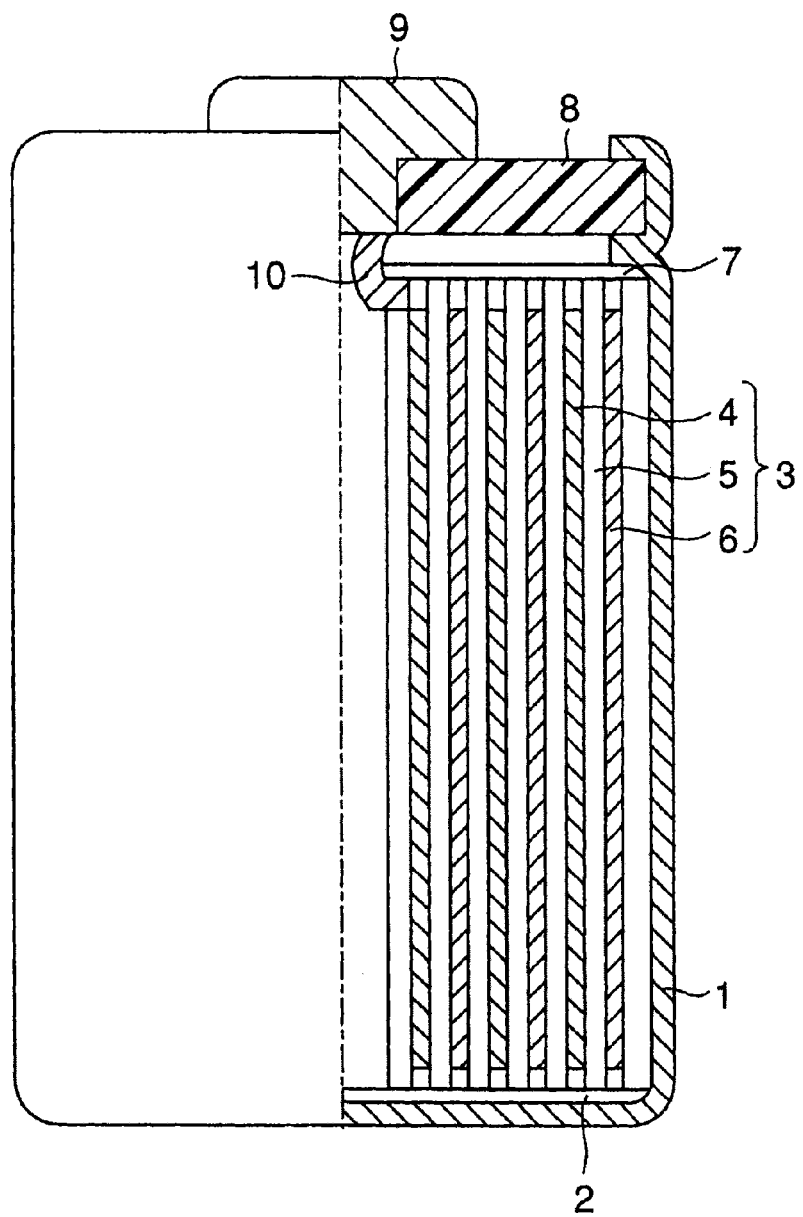

NON-AQUEOUS ELECTROLYTE SECONDARY BATTERY

CROSS-REFERENCE TO RELATED APPLICATION

This application is a continuation-in-part (CIP) application based upon and claims the benefit of priority from Japanese Patent Application No. 2011-133555, filed on Jun. 15, 2011; and International Application PCT/JP2012/054376, the International Filing Date of which is Feb. 23, 2012 the entire contents of which are incorporated herein by reference.

FIELD

Embodiments described herein relate generally to a non-aqueous electrolyte secondary battery.

BACKGROUND

In recent years, non-aqueous electrolyte secondary batteries that are charged and discharged as Li ions move between the negative electrode and the positive electrode have become a subject of active research and development as high energy density batteries. Such non-aqueous electrolyte secondary batteries are anticipated as large-sized power sources particularly for electric cars or hybrid cars that combine an engine and a motor, from the viewpoint of environmental problems. In addition, their use is not limited to the automobile applications, much attention is paid to the non-aqueous electrolyte secondary batteries also as electric power sources.

In such non-aqueous electrolyte secondary batteries, the characteristics of instantaneously releasing a large current are considered important to an extent equal to or higher than that of those non-aqueous electrolyte batteries used in small-sized mobile telephones, notebook PCs and the like.

Furthermore, as the positive electrode, attention is being paid to lithium iron phosphate ($LiFePO_4$) having an olivine type structure, from the viewpoint of resources, and from the viewpoints of high environmental compatibility as well as electrochemical stability, thermal safety and the like.

A battery which uses lithium titanium composite oxide in the negative electrode, and lithium iron phosphate in the positive electrode, can become an innovative secondary battery that is far more safe and has a far longer service life as compared with conventional lithium ion secondary batteries.

However, lithium iron phosphate has a problem that the compound easily reacts with moisture, and iron is likely to be eluted from the positive electrode active material. Furthermore, the inventors confirmed that the lithium titanium composite oxide having a very fine particle size, which is used in the negative electrode, contains a large amount of water of crystallization. That is, in the case of such a combination of a positive electrode and a negative electrode, the large amount of water of crystallization contained in the negative electrode causes dissolution of lithium iron phosphate, deterioration of capacity is prone to occur, and the original potentials of the positive electrode and the negative electrode could not be sufficiently extracted.

A technique of coating, for example, a substance such as $Li_3PO_4$ that is inert to water, or carbon that has electron conductivity in order to suppress such reaction with moisture or the like, is already well known. However, since the substances mentioned as examples are not capable per se of insertion and extraction of lithium, the substances do not contribute to the charge-discharge capacity. Furthermore, at the equilibrium electrode potential at which lithium iron phosphate contributes to the reaction, the diffusion of lithium in $Li_3PO_4$ or carbon almost does not occur inside the solid. Therefore, since such coating serves as an inhibitory factor against the diffusion into lithium iron phosphate, the coating is not suitable for the applications where a large current is required.

BRIEF DESCRIPTION OF THE DRAWINGS

FIG. 1 is a partial cross-sectional diagram of the non-aqueous electrolyte secondary battery of the exemplary embodiment.

DETAILED DESCRIPTION

A non-aqueous electrolyte secondary battery of an embodiment includes A non-aqueous electrolyte secondary battery having a positive electrode active material with excellent water resistance is provided. The non-aqueous electrolyte secondary battery includes a positive electrode containing positive electrode active material particles composed of a core section formed of olivine type $LiFePO_4$; an intermediate section that lies on the outer side of the core section and has a lithium iron phosphate that can be represented by the formula: $LiFe_xP_yO_z$; and a surface section that lies on the outer side of the intermediate section and has lithium iron phosphate that can be represented by the formula: $LiFe_aP_bO_c$; and a negative electrode containing lithium titanate, in which battery the molar concentration ratio of Fe relative to P of the lithium iron phosphate at the core section is greater than the average of the ratio x/y of $LiFe_xP_yO_z$, the average value of the ratio a/b of $LiFe_aP_bO_c$ at the surface section of the positive electrode active material particles is smaller than the average of the ratio x/y of $LiFe_xP_yO_z$, and the positive electrode active material particles include a region in which the ratio x/y of $LiFe_xP_yO_z$ at the intermediate section increases continuously or intermittently in the direction from the surface section toward the core section.

The inventors found a tendency that as the molar concentration ratio of Fe relative to P in the lithium iron phosphate of the positive electrode active material increases, the diffusion of lithium ions can be smoothly achieved, but on the other hand, the effect of preventing the erosion by water is decreased. Here, the molar concentration ratio of Fe to P is represented by, for example, x/y when the lithium iron phosphate is $LiFe_xP_yO_z$. For example, when the positive electrode active materials are all $LiFePO_4$, the molar concentration ratio is indicated as x/y=1.

First, the positive electrode active material particles will be described.

The positive electrode material of the exemplary embodiment is composed of lithium iron phosphate having olivine type $LiFePO_4$ in the core section, an intermediate section that lies on the outer side of the core section and has a lithium iron phosphate which can be represented by the formula: $LiFe_xP_yO_z$, and a lithium iron phosphate which can be represented by the formula: $LiFe_aP_bO_c$ on the outer side of the intermediate section. Furthermore, in the particles of the positive electrode active material, a region in which x/y of $LiFe_xP_yO_z$ increases continuously or intermittently in the direction from the surface section to the core, is included in the positive electrode active material particles. When the increasing region is included, the diffusion of lithium can proceed smoothly. Furthermore, it is constructed such that erosion by water is prevented as a/b at the surface section of the positive electrode active material is decreased. Since this surface section is not the coating layer of $Li_3PO_4$ or the like, the surface section can contribute to the process of charge and discharge.

The positive electrode active material particles of the exemplary embodiment can be subjected to a surface composition analysis using X-rays by XPS (X-ray Photon Spectroscopy). Through an XPS analysis, the bonding state of the various elements and the composition proportions of the various elements of the positive electrode active material can be calculated. The composition proportions of the various elements according to the exemplary embodiment, for example, x/y, which is the molar concentration ratio of Fe to P in the lithium iron phosphate represented by $LiFe_xP_yO_z$, is all obtained by an analysis by XPS. The molar concentration ratios of Fe to P in other lithium iron phosphates are also obtained by an analysis by XPS.

In the analysis by XPS, only an active material powder can be analyzed, but the material can also be analyzed in a state of being fabricated into an electrode. Particularly, in the state of being fabricated into an electrode, it is necessary to wash the active material for one hour with methyl ethyl carbonate (MEC) solvent while an inert atmosphere is maintained, and then to dry the solvent for 10 hours or longer at room temperature. Thereafter, the electrode thus obtained is analyzed by introducing a sample into the XPS chamber while an inert atmosphere is maintained. Particularly, after the production of an electrode or a battery, there is a possibility that the active material becomes susceptible to the influence of moisture or the like in the atmosphere. Thus, it is necessary to maintain the inert atmosphere until immediately before the analysis.

The average particle size of the positive electrode active material particles is preferably from 0.1 μm to 50 μm, and more preferably from 1 μm to 20 μm.

Here, an arbitrary point at the outermost surface or the surface section of the positive electrode active material particle is designated as P1, and a point which satisfies the following conditions in the particle depth direction on the line that connects P1 and the center of the positive electrode active material particle is designated as P2. In the XPS analysis, an analysis of a deep part of the particle is carried out by performing etching from the surface. When P1 is determined as a point at the outermost surface, etching is not performed for the analysis of P1. At this time, the ratios Fe/P (molar concentration ratio of Fe to P) of lithium iron phosphate at P1 and P2 are designated as C(P1) and C(P2). If C(P1)<C(P2) is satisfied, the state is considered as a "state in which the Fe concentration relative to P increases in the direction from the surface section toward the center (core section) of the positive electrode active material." The determination of P2 point is made such that a point where C(P2) is in the range of from 0.95 to 1.05, or a point at which, when the concentration ratio C in a region ranging from 1000 nm to 2000 nm in the depth direction from the surface is 0.85 or greater and maintains fluctuation within the range of ±0.05/100 nm or less, the fluctuation decreases for the first time, is considered as P2.

The depth distance between P2 and P1 is calculated based on the etching time in terms of $SiO_2$. At this time, when any two points selected from an intermediate section between P2 and P1 are designated as P3 and P4 in order of being closer to the surface section, the respective ratios Fe/P (molar concentration ratio of Fe to P) of lithium iron phosphate are designated as C(P1), C(P2), C(P3) and C(P4). When C(P1)<C(P2) is satisfied, and C(P3) and C(P4) are equal to or greater than C(P1) and equal to or less than C(P2), the state is considered as a "state in which the Fe concentration relative to P increases in the intermediate section."

Furthermore, when the relation of C(P1)<C(P3)<C(P4)<C(P2) is satisfied entirely in the range in which the ratio Fe/P between P1 and P2 varies, these are considered as a "state in which the Fe concentration relative to P in the intermediate section varies so as to continuously increase." When a region in which a concentration change is temporarily absent in the depth direction, that is, a region in which C(P1)=C(P3) or C(P3)=C(P4), or a region in which the concentration is temporarily reversed, that is, a region in which C(P3)>C(P4), is included, these are considered as a "state in which the Fe concentration relative to P in the intermediate section varies so as to intermittently increases."

The composition change of the region in which Fe continuously or intermittently increases relative to P, or the range of that region can be found by investigating the intermediate section in detail by an XPS analysis by shifting the positions of P3 and P4.

It is preferable, from the viewpoint of water resistance, that the range of the region that is subject to continuous or intermittent changes start from a point which is deeper by 0.1% or more of the diameter of the particle in the direction from the outermost surface to the center of the positive electrode active material particle. Furthermore, when a region that is subject to continuous or intermittent change is extended to an excessively deep point, the time for diffusion of Li ions becomes long, and therefore, the rate characteristics or the input/output characteristics are adversely affected. Thus, it is preferable that the region that is subject to continuous or intermittent change include up to points that are deep by 20.0% or less of the diameter of the particle in the direction from the outermost surface to the center. Thus, it is preferable that the region be included in the range of from 0.1% to 20% of the diameter of the particle in the direction from the outermost surface to the center of the positive electrode active material particle. It is more preferable that this region that is subject to continuous or intermittent be included in the range of 0.5% to 15% as described above.

If the region of concentration change in the intermediate section is short, or if the concentration change is very steep, it becomes easy to adopt a structure in which a region of high or low lithium concentration surrounds like a shell, in such a manner that the region surrounds the core section of the active material (core-shell structure). When such a structure in which a region of high lithium concentration and a region of low lithium concentration are separated is adopted, the diffusion rate of lithium changes even at the same charge depth. Therefore, as a result, there is a possibility that the input-output characteristics may be greatly different. Accordingly, handling is difficult in controlling the battery, and therefore, it is not preferable.

The core section of the positive electrode active material particle is mostly or entirely composed of olivine type $LiFePO_4$, and in other cases, the core section may contain any one of $Li_3PO_4$, $LiFeP_2O_7$, $LiFe_4(P_2O_7)_3$, $Li_3Fe_2(PO_4)_3$ and the like. In addition, the molar concentration ratio of Fe to P of the lithium iron phosphate at the core section is greater than the average of x/y of $LiFe_xP_yO_z$ in the intermediate section. Furthermore, the molar concentration ratio of Fe to P of the lithium iron phosphate at the core section is from 0.95 to 1.05, and the amount of change of the concentration ratio in the region is smaller than the amount of change of x/y of $LiFe_xP_yO_z$, in the region of the intermediate section.

When the shape of stripes at the surface section and the core section of the positive electrode active material particles, and the difference in the lattice spacing are observed by TEM, and the difference of the crystal phases is checked, the difference of the compounds at the surface and the core section of the positive electrode active material can be verified.

The surface section of the positive electrode active material particles means a region extending up to less than 0.1% of the diameter in the direction from the outermost surface toward the center of a particle of the positive electrode active material. The amount of change of a/b of $LiFe_aP_bO_c$ in the region of the surface section is smaller than the amount of change of x/y of $LiFe_xP_yO_z$ in the region of the intermediate section. In addition, the average of a/b of $LiFe_aP_bO_c$ of the surface section is smaller than the average of x/y of $LiFe_xP_yO_z$ of the intermediate section.

$LiFe_aP_bO_c$ of the surface section is such that from the viewpoint of water resistance, it is more preferable as the ratio a/b is smaller. However, if the ratio a/b is too small, it is not preferable because the diffusivity of Li ions is decreased. Furthermore, also from the viewpoint of the charge-discharge capacity, it is not preferable if the ratio a/b is smaller than 0.1. From the viewpoint of the production process and from the viewpoint of electrochemical stability and thermal stability, it is preferable that olivine type $LiFePO_4$ be included also in the surface. From these, it is preferable that the surface be formed of lithium iron phosphate which includes olivine type $LiFePO_4$ and has an a/b value of 0.1 or greater. Furthermore, if the ratio a/b increases, iron in the positive electrode active material is easily eluted by the inevitable water originating from lithium titanate or the like. Therefore, it is preferable that the ratio a/b be 0.5 or less. Thus, it is preferable that the ratio a/b of $LiFe_aP_bO_c$ of the surface section be from 0.1 to 0.5.

The surface section of the positive electrode active material particle includes at least one or more compounds selected from $Li_3PO_4$, $Li_{1+\alpha}FeP_2O_7$, $Li_\beta Fe_4(P_2O_7)_3$ and $Li_{3+\gamma}Fe_2(PO_4)_3$ and olivine type $LiFePO_4$. Meanwhile, $\alpha$, $\beta$ and $\gamma$ satisfy the conditions of $0 \leq \alpha \leq 1$, $0 \leq \beta \leq 3$, and $0 \leq \gamma \leq 2$. The answer to the question about what compounds the surface section would be composed of can be found by an analysis and interpretation of the crystal phase by TEM-EDX.

In regard to the analysis by TEM, only a powder of the active material can be analyzed, but the active material can also be analyzed in a state of being fabricated into an electrode. Particularly, in the state of being fabricated into an electrode, it is necessary to wash the active material for one hour with methyl ethyl carbonate (MEC) solvent while an inert atmosphere is maintained, and then to dry the solvent for 10 hours or longer at room temperature. Thereafter, the electrode thus obtained is subjected to etching processing and is analyzed by introducing a sample into TEM while an inert atmosphere is maintained. Particularly, after the production of an electrode or a battery, there is a possibility that the active material becomes susceptible to the influence of moisture or the like in the atmosphere. Thus, it is necessary to maintain the inert atmosphere until immediately before the analysis.

Next, the method for producing a positive electrode will be described.

The positive electrode active material particles are obtained by subjecting olivine type $LiFePO_4$ to an acid or water washing treatment, and to a heat treatment in an inert atmosphere. The acid used in the treatment may be any acid that is capable of dissolving iron, such as hydrochloric acid, sulfuric acid or nitric acid. The type of acid, the concentration and the treatment temperature are appropriately adjusted, and the concentration of iron at the surfaces or the interior of the positive electrode active material particles is adjusted. A portion of Fe is eluted from $LiFePO_4$ in advance by performing an acid or water washing treatment, and thus the molar concentration ratios of Fe to P at the surface section and the core section are lowered than that at the core section. While in the state of being subjected to such an acid/water washing treatment, the surface layer (surface section) adopts a disturbed structure. For example, when $Li_{1+\alpha}FeP_2O_7$, $Li_\beta Fe_4(P_2O_7)_3$, $Li_3Fe_2(PO_4)$ and olivine type $LiFePO_4$ are included in the surface after the treatment, the three phases of $Li_{1+\alpha}FeP_2O_7$, $Li_\beta Fe_4(P_2O_7)_3$ and $Li_3Fe_2(PO_4)$ are not sufficiently formed. In this state, lithium diffusion inside the particle is inhibited. Furthermore, since water is accumulated as water of crystallization inside the particles through an acid/water washing treatment, if the particles are left as they are, the erosion reaction of water is rather promoted. Therefore, when the particles are heated in an inert atmosphere after the acid/water washing treatment, the structure of the surface can be converted to a desired form, and when the water of crystallization is removed, positive electrode active material particles having excellent lithium diffusivity and excellent water resistance can be synthesized.

Thereafter, the positive electrode active material thus synthesized, a conductive agent and a binder are suspended in an appropriate solvent, and this suspension is applied on a collector such as an aluminum foil, dried and pressed to be produced into a band-shaped electrode. The positive electrode active material may have, in addition to the lithium composite phosphate compound thus synthesized, various oxides, sulfides, and lithium composite acid compounds incorporated therein. For example, manganese dioxide ($MnO_2$), lithium manganese composite oxide (for example, $LiMn_2O_4$ or $LiMnO_2$), lithium nickel composite oxide (for example, $LiNiO_2$), lithium cobalt composite oxide ($LiCoO_2$), lithium nickel cobalt composite oxide (For example, $LiNi_{1-x}Co_xO_2$), and lithium manganese cobalt composite oxide (for example, $LiMn_xCo_{1-x}O_2$). Examples of the conductive agent include acetylene black, carbon black, and graphite. Examples of the binder include polytetrafluoroethylene (PTFE), polyvinylidene fluoride (PVdF), fluororubber, ethylene-butadiene rubber (SBR), and carboxymethyl cellulose (CMC).

The mixing ratio of the positive electrode active material, the conductive agent and the binder is preferably set in the range of 80% to 95% by weight for the positive electrode active material, 3% to 20% by weight of the conductive agent, and 2% to 7% by weight of the binder.

Next, the negative electrode and the method for the production thereof will be described.

The negative electrode is produced by, for example, mixing a negative electrode mixture which includes a mixed active material of lithium titanium composite oxide and selected from lithium composite oxide and titanium composite oxide containing the negative electrode material for non-aqueous electrolyte batteries of the present invention, a conductive agent and a binder, by suspending the agents in an appropriate solvent, applying a coating liquid thus prepared on one surface or both surfaces of a collector band, and drying the coating liquid.

Furthermore, as the conductive agent used in the negative electrode, a carbon material is usually used. If a carbon material which may be used for the negative electrode active material described above, and is excellent in both the characteristics such as storability of alkali metals and conductivity, it is possible to use the above-described carbon material used as the negative electrode active material in combination with the conductive agent. However, if graphite having high carbon storability such as mesophase pitch carbon fibers is used alone, conductivity is decreased, and therefore, as the carbon material used as the conductive agent, it is preferable to use, for example, acetylene black or carbon black in the negative electrode.

Examples of the binder include polytetrafluoroethylene (PTFE), polyvinylidene fluoride (PVdF), fluororubber, ethylene-butadiene rubber (SBR), and carboxymethyl cellulose (CMC).

The mixing ratio of the negative electrode active material, the conductive agent and the binder is preferably set in the range of 70% to 95% by weight for the negative electrode active material, 0% to 25% by weight of the conductive agent, and 2% to 10% by weight of the binder.

Next, the non-aqueous electrolyte will be described.

Example of the non-aqueous electrolyte include a liquid non-aqueous electrolyte prepared by dissolving an electrolyte in a non-aqueous solvent (non-aqueous electrolyte solution), a polymer gel-like electrolyte containing the non-aqueous solvent and the electrolyte in a polymer material, a polymer solid electrolyte containing the electrolyte in a polymer material, and an inorganic solid electrolyte having lithium ion conductivity.

As the non-aqueous solvent used in the liquid non-aqueous electrolyte, a non-aqueous solvent known for the use in lithium batteries can be used, and examples thereof include cyclic carbonates such as ethylene carbonate (EC) and propylene carbonate (PC); and a non-aqueous solvent mainly composed of a solvent mixture of a cyclic carbonate and a non-aqueous solvent having a lower viscosity than the cyclic carbonate (hereinafter, a second solvent).

Examples of the second solvent include linear carbonates such as dimethyl carbonate, methyl ethyl carbonate, and diethyl carbonate; γ-butyrolactone, acetonitrile, methyl propionate, ethyl propionate; tetrahydrofuran and 2-methyltetrahydrofuran as cyclic ethers; and dimethoxyethane and diethoxyethane as linear ethers.

Examples of the electrolyte include alkali salts, and particularly, lithium salts. Examples of the lithium salts include lithium hexafluorophosphate ($LiPF_6$), lithium tetrafluoroborate ($LiBF_4$), lithium arsenic hexafluoride ($LiAsF_6$), lithium perchlorate ($LiClO_4$), and lithium trifluoromethanesulfonate ($LiCF_3SO_3$). Particularly, lithium hexafluorophosphate ($LiPF_6$) and lithium tetrafluoroborate ($LiBF_4$) are preferred. The amount of the electrolyte dissolved in the non-aqueous solvent is preferably set to from 0.5 to 2.0 mol/l.

The gel-like electrolyte is prepared by dissolving the solvent and the electrolyte in a polymer material and converting the solution into a gel, and examples of the polymer material include polymers of monomers such as polyacrylonitrile, polyacrylate, polyvinylidene fluoride (PVdF), and polyethylene oxide (PECO), and copolymers thereof with other monomers.

The solid electrolyte is a product prepared by dissolving the electrolyte in a polymer material, and solidifying the solution. Examples of the polymer material include polymers of monomers such as polyacrylonitrile, polyvinylidene fluoride (PVdF), and polyethylene oxide (PEO), or copolymers thereof with other monomers. Furthermore, examples of the inorganic solid electrolyte include ceramic materials containing lithium. Among them, $Li_3N$, $Li_3PO_4$—$Li_2S$—$SiS_2$ glass and the like.

A separator may be disposed between the positive electrode and the negative electrode. Furthermore, a gel-like or solid non-aqueous electrolyte layer may be used in combination with this separator, or it is also possible to use a gel-like or solid non-aqueous electrolyte layer instead of the separator. The separator is intended to prevent the contact between the positive electrode and the negative electrode, and is composed of an insulating material. Furthermore, a separator having a morphology in which the electrolyte can move between the positive electrode and the negative electrode is used. Specific examples thereof include non-woven fabrics made of synthetic resins, a polyethylene porous film, a polypropylene porous film, and a cellulose-based separator.

Hereinafter, the exemplary embodiment of the present invention will be described in detail, with reference to the non-aqueous electrolyte secondary battery of FIG. 1.

An example of a partial cross-sectional diagram showing a cylindrical non-aqueous electrolyte secondary battery, which is an exemplary embodiment of the non-aqueous electrolyte battery, is shown in FIG. 1. For example, an insulator 2 is disposed at the bottom of a bottomed, cylindrical container 1 made of stainless steel. An electrode group 3 is accommodated in the container 1. The electrode group 3 is produced by interposing a separator 5 between a positive electrode 4 and a negative electrode 6, and winding the electrode group in a coil form.

Example 1

<Production of Positive Electrode>

A powder of olivine type lithium iron phosphate ($LiFePO_4$) was immersed in 0.5 N sulfuric acid for 30 minutes, and then was subjected to water washing and filtration, and moisture was removed. Thereafter, the powder was heat treated for 3 hours in an Ar atmosphere.

The average particle size of the treated lithium iron phosphate was examined, and was found to be 8.5 μm. This positive electrode powder was subjected to an XPS analysis without performing etching, and the molar concentration ratio of Fe to P (Fe/P) was calculated, which was found to be 0.35. Thereafter, an XPS analysis was carried out while performing etching, and as a result, when the analysis proceeded to a depth of 310 nm or more, no change was seen in the concentration of Fe. The molar concentration ratio of Fe to P at that time was 0.98. That is, it can be considered that the concentration change layer ended, and the composition almost reached $LiFePO_4$. The molar concentration ratio was calculated when there was a concentration change layer which was 3.6% thick with respect to the average particle size. The molar concentration ratio of Fe to P was calculated at the outermost surface and at any two points shallower than 310 nm, in this case, at 80 nm and 220 nm, and as a result, the molar concentration ratios were 0.48 and 0.82. Therefore, the molar concentration ratio of Fe to P was continuously changing. Furthermore, a TEM observation of the particle was carried out, and the lattice fringe near the surface was observed. As a result, it was confirmed that the shape of the stripes and the lattice spacing were different at the surface layer and at the particle core section, and thus there were different crystal phases in the particle. The composition ratios of the respective crystal phases were calculated by TEM-EDX, and as a result, it was confirmed that $Li_3PO_4$ was present at the outermost surface layer, and a $LiFeP_2O_7$ layer was present in the middle part, in addition to the olivine type $LiFePO_4$.

The positive electrode active material thus obtained was mixed with acetylene black, graphite, and polyvinylidene fluoride (PVdF) at a proportion of 100:8:8:6 (all in percent (%) by weight), using a mixer. Furthermore, N-methylpyrrolidone was added thereto and mixed, and the mixture was applied on a collector formed from an aluminum foil having a thickness of 15 μm, dried and then pressed. Thereby, a positive electrode having an electrode density of 1.9 g/cm³ was produced.

<Production of Negative Electrode>

As the negative electrode active material, 85% by weight of a powder of a negative electrode active material, 5% by weight of graphite as a conductive agent, 3% by weight of acetylene black similarly as a conductive agent, 7% by weight of PVdF, and NMP were added to and mixed with spinel-type lithium titanium oxide, and the mixture was applied on a collector formed from an aluminum foil having a thickness of 11 μm, dried and pressed. Thereby, a negative electrode was produced.

<Production of Electrode Group>

The positive electrode, a separator formed from cellulose and a porous film made of polyethylene, the negative electrode, and the separator were laminated in this order, and then the laminate was wound in a coil form such that the negative electrode would be positioned on the outermost periphery. Thus, an electrode group was produced.

<Preparation of Non-Aqueous Electrolyte Solution>

Furthermore, lithium hexafluorophosphate ($LiPF_6$) was dissolved in a solvent mixture of ethylene carbonate (EC) and methyl ethyl carbonate (MEC) (mixing volume ratio 1:2) at a concentration of 1.0 mol/L, and thus a non-aqueous electrolyte solution was prepared.

The electrode group and the electrolyte solution were respectively accommodated in a bottomed, cylindrical container made of stainless steel, and thus a cylindrical non-aqueous electrolyte secondary battery was assembled.

The battery thus produced was subjected to charge and discharge three times at 1C rate in the range of 2.3 V to 1.0 V, and the capacity was checked.

Examples 2 to 6

The production of the active materials and the production of the battery was carried out in the same manner as in Example 1, except that the conditions for the production of the positive electrode were changed. A summary of the constitutions such as the surface composition that is the same as that used in Example 1 is presented in Table 1.

TABLE 1

| | Fe/P ratio from outermost surface to $LiFePO_4$ layer surface | | | | Proportion of concentration change layer (concentration change layer/ average particle size) | Crystal phase contained in addition to $LiFePO_4$ |
|---|---|---|---|---|---|---|
| | C(P1) | C(P3) | C(P4) | C(P2) | | |
| Example 1 | 0.35 | 0.48 | 0.53 | 0.98 | 3.6% | $Li_3PO_4$, $LiFeP_2O_7$ |
| Example 2 | 0.1 | 0.34 | 0.73 | 1.02 | 5.8% | $Li_3PO_4$, $Fe_4(P_2O_7)_3$ |
| Example 3 | 0.5 | 0.67 | 0.65 | 0.95 | 4.5% | $LiFe_2PO_7$ |
| Example 4 | 0.23 | 0.55 | 0.76 | 1.01 | 0.1% | $Li_3PO_4$, $LiFeP_2O_7$, $Fe_4(P_2O_7)_3$ |
| Example 5 | 0.18 | 0.58 | 0.72 | 1.01 | 20.0% | $Li_3PO_4$, $LiFeP_2O_7$, $Li_3Fe_2(PO_4)_3$ |
| Example 6 | 0.21 | 0.38 | 0.53 | 0.98 | 10.2% | $Li_3PO_4$ |
| Comparative Example 1 | 0 | 0 | 0 | 0.98 | 0.0% | none |
| Comparative Example 2 | 0 | 0 | 0 | 1.02 | 0.0% | C |
| Comparative Example 3 | 0 | 0 | 0 | 0.96 | 0.0% | $Li_3PO_4$ |

Comparative Example 1

A battery was produced by the same method as that used in Example 1, except that bare $LiFePO_4$ was used in the positive electrode.

Comparative Example 2

A battery was produced by the same method as that used in Example 1, except that the $LiFePO_4$ of the positive electrode was coated with 2.5 wt % of carbon.

Comparative Example 3

A battery was produced by the same method as that used in Example 1, except that the $LiFePO_4$ of the positive electrode was coated with $Li_3PO_4$ simply without any concentration gradient.

<Experimental Results: Capacity Measurement, Storage Test>

The batteries of Examples 1 to 6 and Comparative Examples 1 to 3 were adjusted to a state of SOC 100%, and a storage test was carried out in an environment at 80° C. The batteries were returned to 25° C. at an interval of one week, and the capacity was measured. Thereafter, the process of bringing the batteries again to the state of SOC 100% and storing them in an environment at 80° C. was repeatedly carried out, and thus the test was carried out for 10 weeks in total. The ratios (%) of the capacity after 10 weeks relative to the capacity before storage are summarized in Table 2.

As a result, as shown in Comparative Example 1, bare $LiFePO_4$ had low water resistance and exhibited significant capacity deterioration. On the other hand, It was confirmed in Example 1 and so on that as the ratio of the Fe concentration at the surface was lower, the capacity deterioration was smaller. It can be contemplated that this originates from the fact that the batteries were not easily affected by the water contained in the negative electrode or the like.

<Experiment Results: Rate Test>

The capacities at 1C rate of the batteries of Examples 1 to 6 and Comparative Examples 1 to 3, and the capacities at 30C rate of the batteries were measured. The capacity maintenance factors of the capacity at 30C rate relative to the capacity at 1C rate are summarized in Table 2.

TABLE 2

| | Capacity ratio after storage test at 80° C. | 30 C capacity maintenance factor |
|---|---|---|
| Example 1 | 82% | 82% |
| Example 2 | 87% | 85% |
| Example 3 | 83% | 81% |
| Example 4 | 75% | 87% |
| Example 5 | 93% | 78% |
| Example 6 | 89% | 80% |
| Comparative Example 1 | 38% | 88% |
| Comparative Example 2 | 55% | 83% |
| Comparative Example 3 | 72% | 65% |

As a result, as shown in Comparative Example 2, carbon-coated $LiFePO_4$ had excellent water resistance, but the rate characteristics were poor as compared with Example 1 and the like.

From the results described above, it could be confirmed that when the present invention is carried out, the battery has superior high temperature durability while maintaining rate characteristics.

The present invention is not intended to be limited to the precise forms of the exemplary embodiment disclosed above, and the invention can be specifically defined at the stage of implementation, by making modifications and variations of the constituent elements to the extent that the gist is maintained. Furthermore, various inventions can be formed by appropriately combining the plural constituent elements disclosed in the exemplary embodiment. For example, several constituent elements may be deleted from the entire constituent elements disclosed in the exemplary embodiment. Furthermore, the constituent elements according to different embodiments may be appropriately combined.

What is claimed is:

1. A non-aqueous electrolyte secondary battery comprising:
   a positive electrode containing positive electrode active material particles comprising a core section formed of olivine type $LiFePO_4$; an intermediate section that lies on an outer side of the core section and has a lithium iron phosphate that can be represented by the formula: $LiFe_xP_yO_z$; and a surface section that lies on an outer side of the intermediate section and has lithium iron phosphate that can be represented by the formula: $LiFe_aP_bO_c$; and
   a negative electrode containing lithium titanate,
   wherein the molar concentration ratio of Fe relative to P of the lithium iron phosphate at the core section being greater than an average of the ratio x/y of $LiFe_xP_yO_z$,
   an average value of the ratio a/b of $LiFe_aP_bO_c$ at the surface section of the positive electrode active material particles being smaller than the average of the ratio x/y of $LiFe_xP_yO_z$, and
   the positive electrode active material particles including a region in which the ratio x/y of $LiFe_xP_yO_z$ at the intermediate section increases continuously or intermittently in the direction from the surface section toward the core section.

2. The non-aqueous electrolyte secondary battery according to claim 1, wherein the region is included in the range of from 0.1% to 20% of the diameter of the particle in the direction from an outermost surface to the center of the positive electrode material particle.

3. The non-aqueous electrolyte secondary battery according to claim 1, wherein the region is included in the range of from 0.5% to 15% of the diameter of the particle in the direction from an outermost surface to the center of the positive electrode material particle.

4. The non-aqueous electrolyte secondary battery according to claim 1, wherein the ratio x/y of $LiFe_xP_yO_z$ at the surface section of the positive electrode active material particle as obtained by an XPS analysis is from 0.1 to 0.5.

5. The non-aqueous electrolyte secondary battery according to claim 1, wherein the surface section of the positive electrode active material particle contains at least one or more compounds selected from $Li_3PO_4$, $Li_{1+\alpha}FeP_2O_7$, $Li_\beta Fe_4(P_2O_7)_3$ and $Li_{3+\gamma}Fe_2(PO_4)_3$ ($0\leq\alpha\leq 1$, $0\leq\beta\leq 3$, and $0\leq\gamma\leq 2$), and olivine type $LiFePO_4$.

6. The non-aqueous electrolyte secondary battery according to claim 1, wherein the positive electrode active material particles are subjected to an acid or water washing treatment, and to a heating treatment in an inert atmosphere.

7. The non-aqueous electrolyte secondary battery according to claim 1, wherein the intermediate section and the surface section are subjected to an acid or water washing treatment, and to a heating treatment in an inert atmosphere.

8. The non-aqueous electrolyte secondary battery according to claim 1, wherein the range of the region that is subject to continuous or intermittent change starts from a point which is deeper by 0.1% or more of the diameter of the particle in the direction from an outermost surface to the center of the positive electrode active material particle.

9. The non-aqueous electrolyte secondary battery according to claim 1, wherein the molar concentration ratio of Fe relative to P of the lithium iron phosphate at the core section is from 0.95 to 1.05.

10. The non-aqueous electrolyte secondary battery according to claim 1, wherein the amount of change of the molar concentration ratio of Fe relative to P of the lithium iron phosphate at the core section is smaller than the amount of change of the ratio x/y of $LiFe_xP_yO_z$ in the region of the intermediate section.

* * * * *